United States Patent
Heinzinger et al.

(10) Patent No.: US 10,393,541 B2
(45) Date of Patent: Aug. 27, 2019

(54) AIRCRAFT NAVIGATION SYSTEM AND METHOD FOR AIRCRAFT NAVIGATION

(71) Applicant: Airbus Defence and Space GmbH, Taufkirchen (DE)

(72) Inventors: Olaf Heinzinger, München (DE); Matthias Oberhauser, München (DE); Sèbastien Mamessier, München (DE); Rafael Fernandes De Oliveira, München (DE); Daniel Dreyer, Hohenkammer (DE)

(73) Assignee: Airbus Defence and Space GmbH (DE)

( * ) Notice: Subject to any disclaimer, the term of this patent is extended or adjusted under 35 U.S.C. 154(b) by 0 days.

(21) Appl. No.: 15/580,083

(22) PCT Filed: Jun. 2, 2016

(86) PCT No.: PCT/EP2016/062471
§ 371 (c)(1),
(2) Date: Dec. 6, 2017

(87) PCT Pub. No.: WO2016/198306
PCT Pub. Date: Dec. 15, 2016

(65) Prior Publication Data
US 2018/0136007 A1    May 17, 2018

(30) Foreign Application Priority Data

Jun. 12, 2015 (EP) .................................... 15171787

(51) Int. Cl.
*G01C 23/00* (2006.01)
*G08G 5/00* (2006.01)
*B64D 43/00* (2006.01)

(52) U.S. Cl.
CPC ........... *G01C 23/005* (2013.01); *B64D 43/00* (2013.01); *G08G 5/0047* (2013.01)

(58) Field of Classification Search
CPC .. G01C 23/00; G01C 23/0005; G09G 3/2003; G06T 19/006; G08G 5/0056; G08G 1/165; B60K 35/00; G05D 1/042
See application file for complete search history.

(56) References Cited

U.S. PATENT DOCUMENTS

| 4,454,510 A * | 6/1984 | Crow .................... G09B 9/006 342/32 |
| 6,868,320 B1 * | 3/2005 | Burch .................... G01C 23/00 340/995.27 |

(Continued)

FOREIGN PATENT DOCUMENTS

EP    2 233 888 A2    9/2010

OTHER PUBLICATIONS

EP 15 17 1787 Search Report dated Nov. 23, 2015.
PCT/EP201/062471 Search Report dated Sep. 13, 2016.

*Primary Examiner* — Hoi C Lau
(74) *Attorney, Agent, or Firm* — Lerner, David, Littenberg, Krumholz & Mentlik, LLP

(57) ABSTRACT

An aircraft navigation system and a method for aircraft navigation is presented. The aircraft navigation system has a navigation-map data source, navigation-map data provided by the navigation-map data source including information about a multitude of objects O on earth surface which are of high potential visibility and high potential identifiability from elevated positions, each information for an object O∈O including a position and a type of the respective object O; a first system for measuring an actual aircraft position P(t); a waypoint data source providing waypoints $WP_i$ defining an aircraft intended flight track; a second system for selecting per waypoint $WP_i$ one object $O_i(WP_i)$ with $O_i(WP_i) \in O$ (Continued)

Figure 1:
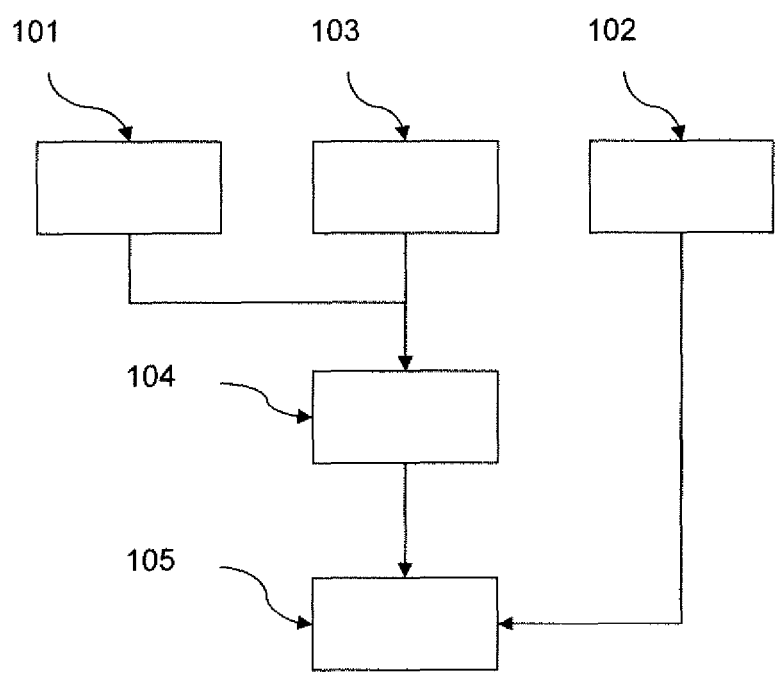

depending on given selection criteria; and a display for displaying an information $I(O_i(WP_i)$ referring the selected object $O_i(WP_i)$.

14 Claims, 2 Drawing Sheets

(56) References Cited

U.S. PATENT DOCUMENTS

| | | | | |
|---|---|---|---|---|
| 6,985,091 | B2* | 1/2006 | Price | G01C 23/005 340/966 |
| 7,010,398 | B2* | 3/2006 | Wilkins, Jr. | G01C 23/005 244/75.1 |
| 7,072,746 | B1* | 7/2006 | Burch | G01C 21/20 340/973 |
| 7,415,336 | B1* | 8/2008 | Burch | G01C 23/00 340/994 |
| 8,068,038 | B2* | 11/2011 | Engels | G08G 5/045 340/970 |
| 8,180,503 | B2* | 5/2012 | Estabrook | B64C 13/18 340/945 |
| 8,311,687 | B2* | 11/2012 | Bakker | G05D 1/0607 244/182 |
| 8,532,849 | B1* | 9/2013 | Tsai | G01C 23/00 340/979 |
| 8,600,588 | B2* | 12/2013 | Del Amo Blanco | G08G 5/0034 701/14 |
| 9,266,610 | B2* | 2/2016 | Knapp | G06Q 10/10 |
| 9,460,629 | B2* | 10/2016 | Chircop | G08G 5/0034 |
| 9,557,742 | B2* | 1/2017 | Paduano | G05D 1/042 |
| 9,791,866 | B2* | 10/2017 | Paduano | G05D 1/042 |
| 9,826,206 | B2* | 11/2017 | Mochizuki | G09G 3/2003 |
| 9,868,527 | B2* | 1/2018 | Knapp | G06Q 10/10 |
| 9,958,875 | B2* | 5/2018 | Paduano | G05D 1/042 |
| 2003/0193411 | A1* | 10/2003 | Price | G01C 23/005 340/973 |
| 2003/0222887 | A1* | 12/2003 | Wilkins, Jr. | G01C 23/005 345/618 |
| 2008/0039988 | A1* | 2/2008 | Estabrook | B64C 13/18 701/14 |
| 2010/0090869 | A1 | 4/2010 | Wipplinger et al. | |
| 2010/0194602 | A1* | 8/2010 | Engels | G01C 23/00 340/979 |
| 2010/0250119 | A1* | 9/2010 | Cundiff | G01C 23/00 701/467 |
| 2012/0029735 | A1* | 2/2012 | Bakker | G05D 1/0005 701/3 |
| 2013/0006450 | A1* | 1/2013 | Del Amo Blanco | G08G 5/0034 701/14 |
| 2014/0343765 | A1* | 11/2014 | Suiter | G08G 5/0056 701/18 |
| 2014/0379173 | A1* | 12/2014 | Knapp | G06Q 10/10 701/2 |
| 2015/0191075 | A1* | 7/2015 | Fueller | G06T 19/006 345/633 |
| 2015/0254983 | A1* | 9/2015 | Mochizuki | G08G 1/165 340/435 |
| 2015/0323932 | A1* | 11/2015 | Paduano | G05D 1/042 701/3 |
| 2016/0202699 | A1* | 7/2016 | Knapp | G06Q 10/10 701/3 |
| 2017/0001522 | A1* | 1/2017 | Mochizuki | B60K 35/00 |
| 2017/0011709 | A1* | 1/2017 | Kuwabara | B60K 35/00 |
| 2017/0104968 | A1* | 4/2017 | Mochizuki | G09G 3/2003 |
| 2017/0168507 | A1* | 6/2017 | Paduano | G05D 1/042 |
| 2017/0220041 | A1* | 8/2017 | Tanaka | G05D 1/0094 |
| 2017/0301109 | A1* | 10/2017 | Chan | G06K 9/0063 |
| 2017/0371355 | A1* | 12/2017 | Paduano | G05D 1/042 |
| 2018/0136007 | A1* | 5/2018 | Heinzinger | G01C 23/005 |
| 2018/0224869 | A1* | 8/2018 | Paduano | G05D 1/042 |
| 2018/0265195 | A1* | 9/2018 | Knapp | G06Q 10/10 |
| 2019/0079509 | A1* | 3/2019 | Bosworth | B64D 1/08 |

* cited by examiner

AIRCRAFT NAVIGATION SYSTEM AND METHOD FOR AIRCRAFT NAVIGATION

CROSS-REFERENCE TO RELATED APPLICATIONS

The present application is a national phase entry under 35 U.S.C. § 371 of International Application No. PCT/EP2016/062471 filed Jun. 2, 2016, published in English, which claims priority from European Patent Application No. 15171787.3 filed Jun. 12, 2015, all of which are incorporated herein by reference.

This invention relates to an aircraft navigation system and a method for aircraft navigation, especially for an aircraft operated under VFR weather conditions (VFR=Visual Flight Rules). Further, the invention relates to an aircraft comprising said aircraft navigation system.

Visual Flight Rules (VFR) are rules regulating aircraft operations under VFR weather conditions. These VFR weather conditions, although depending on individual state regulations and airspaces, require certain flight visibilities, ground visibilities and distances to clouds allowing a pilot to control and navigate his aircraft using outside view. Hence, in VFR weather conditions also clouds or ground fog may be present if not conflicting with the visual fligt rules.

Aircraft navigation on VFR flights is mainly terrestrial navigation, thus based on identification of objects or POI (points of interest) on earth surface, which are advantageously selected from objects which are of high potential visibility and high potential identifiability from elevated positions, i.e. from the cockpit of a flying aircraft.

In this respect, the term "potential" refers to the fact that objects/POI on earth surface which are visible under clear atmospheric conditions and identifiable for a pilot in an aircraft, may actually not be visible to the pilot because of clouds or ground fog or other atmospheric effects obstructing the sight to the respective object/POI from the actual position of the aircraft. In this respect, these objects/POI have a "potential" visibility and identifiability.

The term "high" indicates that only objects should be chosen for terrestrial navigation which are of certain dimension and/or geometry and/or contrast related to surroundings ensuring their easy, reliable and clear-cut identification.

For each VFR flight, a flight plan from a departure airfield to a destination airfield along a desired flight route defined by multiple waypoints is to be generated taking into account airspace restrictions, terrain and wind information and aircraft related data. The flight time between these waypoints and the total flight time is to be calculated and used as reference during actual flight. Especially due to changing actual wind conditions and/or actual changes of the flight route, the actual flight typically differs from the planned flight, in respect to the routing, the respective flight times, the respective fuel burn, etc.

For checking the progress of the actual VFR flight in relation to the planned VFR flight, the pilots use said objects on earth surface. These objects for example can be highways, power lines, buildings, highways crossings, churches, mountain summits, towers, bridges, lakes, rivers, railway lines, etc. These objects are usually shown on aeronautical maps for flight planning, as well as on moving maps presented on aircraft navigation systems. Nevertheless, a pilot has to keep in mind the chosen objects by him or herself. Especially in areas with multiple, densely populated airspaces it is important to maintain positional awareness to avoid airspace violations.

The current operational usage of such objects for terrestrial navigation by the pilots imply a certain level of workload to the pilot. The pilot has to select such objects on his navigation map and transfer the map information to the outside three dimensional visual situation to identify the respective objects. Especially in high workload situations and when flying in an area the pilot is not used to this transfer and identification is prone to error.

Therfore, it is an object of the present invention to provide a new and improved system for aircraft navigation which reduces the navigation workload of the pilot on VFR flights.

It is another object of the present invention to provide a new and improved method for aircraft navigation which reduces the navigation workload of the pilot on VFR flights.

It is still another object of the present invention to provide an aircraft with said new and improved system for aircraft navigation.

A first aspect of the invention is directed to an aircraft navigation system comprising: a navigation-map data source, navigation-map data provided by the navigation-map data source including information about a multitude of objects O on earth surface which are of high potential visibility and high potential identifiability from elevated positions, each information for an object O∈O including a position and a type of the respective object O; a first system for measuring an actual aircraft position P(t); a waypoint data source providing waypoints $WP_i$ defining an aircraft intended flight track; a second system for selecting per waypoint $WP_i$ one object $O_i(WP_i)$ with $O_i(WP_i) \in O$ depending on given selection criteria; and a display for displaying an information $I(O_i(WP_i))$ referring the selected object $O_i(WP_i)$.

The aircraft navigation system may be used for flight planning purposes in a planning phase or during the actual flight in a flight phase. This enables a selection of optimal objects $O_i(WP_i)$ for terrestrial navigation.

In a preferred embodiment the displaying of the information $I(O_i(WP_i))$ referring to the selected objects $O_i(WP_i)$ depend on the actual position P(t) of the aircraft. In one embodiment, the information $I(O_i(WP_i))$ is displayed if the position P(t) is within a limited area around the position of the waypoint $WP_i$.

During an actual flight, the aircraft navigation system enables selection and display of objects $O_i(WP_i)$ to the pilot having optimal visibility and identifiability depending on the actual aircraft position P(t). Thus, the aircraft navigation system is reducing the workload of the pilot and is reducing potential navigation errors.

The navigation-map data source may be a USB-stick, a CD-ROM, a RAM, a computer, a server, or a data cloud etc. The navigation-map data source or navigation-map data storage stores and provides navigation map data. The navigation map data fundamentally comprise information typically presented on VFR navigation maps (airspace restrictions, surface elevations, airfields, cities, road network, rivers, railway line network etc.). In addition to such fundamental VFR navigation map information, the navigation-map data include information about a multitude of individual objects O on earth surface which are of high potential visibility and high potential identifiability from elevated positions. Each information for an object O∈O is including a position and a type of the respective object O. The types of the objects O comprise for example: lakes, shorelines, highways, streets, crossings, buildings, towers, bridges, churches etc.

In a preferred embodiment, the information for an object O∈O further includes a ranking index concerning the potential visibility and the potential identifiability of the object O. The term "potential" indicates a visibility and identifiability under clear sky situations. The combination of "visibility" of an object and "identifiability" of an object is important, because an object having a good visibility, because there are no obstructions hiding the object, may not in any case have a good identifiablility, because e.g. the object is too small for clear cut identification from distant elevated positions. The ranking index may be a value which is increasing with increasing visibility and identifiability of the respective object O.

The first system may be a satellite navigation system (GPS, Galileo, Glonass etc.) or an inertial reference system, or another known positioning system (i.e. based on VOR, TACAN, ADF LORAN-C data) or a combination thereof.

The waypoint data source may be for example a USB-stick, a CD-ROM, a RAM, a computer, a server, or a data cloud etc. The waypoint data source is providing waypoint data $WP_i$, which may manually be entered by the pilot or which may be downloaded into the waypoint data source from other data media before the flight or during flight. The waypoints $WP_i$ are for example given in coordinates like geographical grid coordinates (latitude and longitude coordinates). The waypoints $WP_i$ are typically defining points of heading changes and/or other significant points along a VFR flight route.

The second system for selecting per waypoint $WP_i$ one object $O_i(WP_i)$ from the navigation-map data source, with $O_i(WP_i) \in O$ depending on given selection criteria uses data links to the navigation-map data source, to the waypoint data source and to the first system. The selection criteria determine how the selection of the object $O_i(WP_i)$ is performed. The selection criteria may be provided in the navigation-map data. The selection criteria may be provided from a (separate) selection-criteria data source (e.g.: USB-stick, a CD-ROM, a RAM, a computer, a server, or a data cloud etc.).

In a preferred embodiment, the selection criteria consider a distance $d_{i,n}=|WP_i O_n(WP_i)|$ between a waypoint $WP_i$ and positions of neighbouring objects $O_n(WP_i)$, with $O_n \in O$, and/or the ranking index of the neighbouring objects $O_n(WP_i)$ concerning their potential visibility and potential identifiability. In a preferred embodiment, neighbouring objects $O_n(WP_i)$ are selected which have the highest ranking index value of the neighbouring objects $O_n(WP_i)$ and which are positioned within a given maximum distance $d \leq D_{max}$ from the respective waypoint $WP_i$. In another preferred embodiment, neighbouring objects $O_n(WP_i)$ are selected based on a given optimization algorithm based on the ranking index value of the neighbouring objects $O_n(WP_i)$ and the distance $d_{i,n}$. There is a trade-off between the ranking index values and the distance $d_{i,n}$ of the objects $O_n(WP_i)$, because a high ranking index value of an object $O_n(WP_i)$ with a greater distance $d_{i,n}$ will be as suitable as a lower ranking index value of an object $O_n(WP_i)$ with a smaller distance $d_{i,n}$. The selection criteria determine how the selection of the object $O_i(WP_i)$ is performed.

In a preferred embodiment, the selection criteria consider actual optical atmospheric conditions and/or the actual aircraft position $P(t)$, the actual optical atmospheric conditions being provided by an actual-atmospheric-conditions data source. The actual-atmospheric-conditions data source may be a server or a computer or a smartphone, or tablet PC, etc. connected to the second system, preferably via mobile internet or satellite data link.

In a preferred embodiment the actual optical atmospheric conditions are provided as horizontal visual ranges and or slant visual ranges in m or km or NM depending on the 3D-position in the atmosphere.

In a preferred embodiment the aircraft navigation system checks during flight the actual visibility of the objects $O_i(WP_i)$ based on provided actual optical atmospheric conditions data, and changes the selection of the object $O_i(WP_i)$ out of $O_n(WP_i)$ based on the actual best visibile and identifiable object out of $O_n(WP_i)$.

In a preferred embodiment, the selection of one object $O_i(WP_i)$ per waypoint $WP_i$ is depending on ranking index values of the objects $O_n(WP_i)$ which are corrected depending on the actual optical atmospheric conditions around the position $P(t)$ of the aircraft and/or the actual optical atmospheric conditions around the position around the considered neighbouring objects $O_n(WP_i)$. In this case only objects $O_i(WP_i)$ may be selected which are actually visible to the pilot. In a preferred embodiment, the waypoints $WP_i$ and/or the actual aircraft position $P(t)$ are provided in three spatial dimensions.

In a preferred embodiment, the ranking index for each object $O \in O$ concerning its potential visibility and its potential identifiability is determined based on the relative size of the object O compared to an environment $E(O)$ of the object O and/or on a visible brightness contrast and/or on a visible colour contrast between the object O and the environment $E(O)$ of the object O. Further, the ranking index may be depending on the geometric shapes of the objects O.

In a preferred embodiment, the ranking index for each object $O \in O$ concerning its potential visibility and potential identifiability may be manually entered into a manual-ranking data source, or may be manually changed or corrected in the navigation map data or the manual-ranking data source by the pilot. This allows an individual adjustment of the ranking index of individual objects O oder object classes of $O \in O$.

In a preferred embodiment, the selection criteria consider a weighting of the ranking index and the distance $d_{i,n}$.

In a preferred embodiment, the display is a head-up-display, a display of smart glasses, or a navigation display or a primary flight display of the aircraft or a combination thereof.

In a preferred embodiment, the information $I(O_i(WP_i))$ to be displayed on the display is a symbol representing the object $O_i(WP_i)$, a picture of the real object $O_i(WP_i)$, an alphanumeric information describing the object $O_i(WP_i)$, an animation of the object $O_i(WP_i)$ or a combination thereof. In a preferred embodiment, the picture or an animation of the real object $O_i(WP_i)$ is displayed In a preferred embodiment, the display is a head-up display or a display of smart glasses and wherein the information $I(O_i(WP_i))$ is displayed in correct positional alignment with the position of the real object $O_i(WP_i)$ as can seen by a user in the visible background of the respective display (conformal symbology). This ensures an optimal guidance for identification of the real objects $O_i(WP_i)$ by the pilot. The information $I(O_i(WP_i))$ may be for example a symbol e.g. a circle, a cross, an arrow, a triangle, a square etc., or alphanumeric text, or an outline oft the object according to its shape or a combination thereof. Advantageously the information $I(O_i(WP_i))$ is displayed in conformal symbology.

The aircraft navigation system may be used for flight planning in a planning phase. The basis for the flight planning are the navigation-map data and the waypoints $WP_i$ data determining the aircraft's intended flight track. The waypoints $WP_i$ are typically entered by the pilot. In a preferred embodiment, if the pilot sets a new waypoint $WP_i$ (e.g. latitude and longitude coordinates) a list of neighbouring objects $O_n(WP_i) \in O$ in a limited area around the waypoint coordinates is selected and displayed.

In a preferred embodiment, the list of these objects $O_n(WP_i)$ is sorted or weighted according to the selection criteria to provide the most useful item on top of the list. This weighting may be done using:
 a) the distance $d_{i,n}$ between the waypoint $WP_i$ and the objects $O_n(WP_i)$,
 b) a fixed ranking of the different types of objects O (e.g. Lake>Highway>Street>Village . . . ),
 c) a ranking of objects O in a database that is preprogrammed by the maintainers of the data,
 d) a ranking that is based on the previous pilots selections.
 e) a ranking based on the estimated visibility.

Variant a) takes not into account the visibility of the objects O and should be combined with b). Nevertheless, a fixed POI type ranking might not be suitable in all cases. Therefore a weighting could be stored in the database as well. The maintenance of this data can be done by a small group of experts c) or can be crowd-based on several user selections d) that have been conducted by all users of the system. It is also possible to calculate a 'visibility index' e), taking into account the relative size and exposedness of the respective object O. Thus, a high and large wind mill would get a higher ranking than a small house.

The aircraft navigation system may also be used during flight planning i.e. in a flight phase. In a preferred embodiment based on the waypoints $WP_i$ and the associated objects $O_i(WP_i)$, a prediction on the arrival at the next waypoint can be calculated. To aid the pilot navigating the aircraft and identifying the objects $O_i(WP_i)$, the information on the next waypoint $WP_i$ is displayed.

In addition to just visualizing singular waypoints and objects $O_i$, it is also possible to visualize longer navigation aids in text form. This could be a message like "Keep on the left side of the Highway till the next intersection".

There are different types of visualizations of waypoints $WP_i$ and objects $O_i(WP_i)$ possible, e.g.:
 a) highlighting the next waypoint $WP_i$ and/or related object $O_i(WP_i)$ on the flight route in a 2D moving map display,
 b) highlighting the next waypoint $WP_i$ and/or related object $O_i(WP_i)$ on the PFD,
 c) highlighting the next waypoint $WP_i$ and/or related object $O_i(WP_i)$ using a Head Up Display,
 d) highlighting the next waypoint $WP_i$ and/or related object $O_i(WP_i)$ using a Head Worn Device (e.g. Google Glass, Epson BT-200),
 e) issue an aural information about the next waypoint $WP_i$ and/or related object $O_i(WP_i)$.

With Head Up Displays or Head Worn Devices, a pilot can look out and monitor the airspace without the need of gathering information (e.g. Speed, Altitude) from head down displays. Especially in VFR conditions, this has a positive effect on the situation awareness. These devices are used to show static information (numerical or textual) or conformal information (in line with the outside visual) in the field of view of the user.

In one embodiment, the objects $O_i(WP_i)$ are selected automatically by the aircraft navigation system. In another embodiment, the system automatically produces and displays a list of possible objects $O_n(WP_i)$ for a waypoint $WP_i$, from which the pilot can select the objects $O_i(WP_i)$ on his own discretion.

In a preferred embodiment, the aircraft navigation system consists of a display unit and a computation unit. The computation unit has access to a navigation-map data source and to a GPS receiver (as first system). A modern glass-cockpit for general aviation consists of a Navigation Display (ND) and a Primary Flight Display (PFD). For communality reasons the aircraft navigation system can be integrated into such a common cockpit configuration. In one implementation, the Navigation Display is a removable device (e.g. i-pad). Therefore, the flight can be planned using this device (planning phase) and it can be used for navigating in the air (in flight phase). This device can be used for entry and visualization of the waypoints.

A further aspect of the invention concerns an aircraft with an aircraft navigation system according to the preceeding description.

A further aspect of the invention concerns a method for aircraft navigation comprising the steps: providing navigation-map data including information about a multitude of objects O on earth surface which are of high potential visibility and high potential identifiability from elevated positions, each information for an object $O \in O$ including a position and a type of the respective object O; measuring an actual aircraft position P(t); providing waypoints $WP_i$ defining an aircraft intended flight track; selecting per waypoint $WP_i$ one object $O_i(WP_i)$ with $O_i(WP_i) \in O$ depending on given selection criteria; and displaying an information $I(O_i(WP_i))$ referring the selected object $O_i(WP_i)$ depending on the actual aircraft position P(t).

Figure 2:
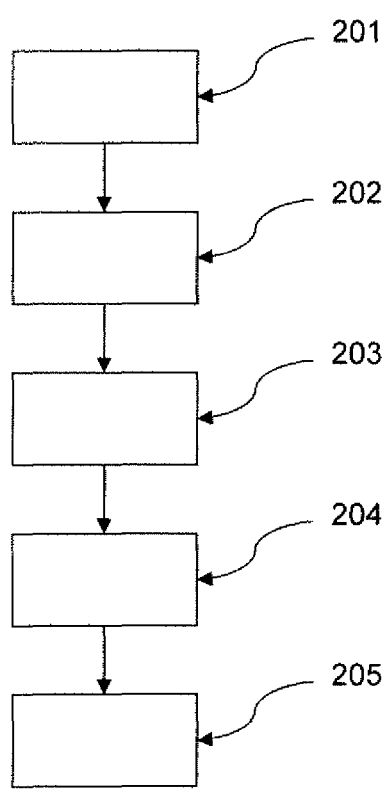

The above-mentioned and other objects, advantages and features for the invention will become more apparent when considered with the following specification and the accompanying drawings wherein:

FIG. 1 shows a basic set-up of an aircraft navigation system according to an embodiment of this invention, and FIG. 2 shows the steps of a basic method for aircraft navigation according to an embodiment of this invention, FIG. 1 shows a basic set-up of an aircraft navigation system according to an embodiment of this invention. The aircraft navigation system is comprising a navigation-map data source 101, navigation-map data provided by the navigation-map data source 101 including information about a multitude of objects O on earth surface which are of high potential visibility and high potential identifiability from elevated positions, each information for an object $O \in O$ including a position and a type of the respective object O. The navigation system is further comprising a first system 102 for measuring an actual aircraft position P(t); a waypoint data source 103 providing waypoints $WP_i$ defining an aircraft intended flight track; a second system 104 for selecting per waypoint $WP_i$ one object $O_i(WP_i)$ with $O_i(WP_i) \in O$ depending on given selection criteria; and a display 105 for displaying an information $I(O_i(WP_i))$ depending on the actual aircraft position P(t) referring the selected object $O_i(WP_i)$.

FIG. 2 shows the steps of a basic method for aircraft navigation according to an embodiment of this invention. The method for aircraft navigation comprising the following steps: In a first step 201, navigation-map data including information about a multitude of objects O on earth surface which are of high potential visibility and high potential identifiability from elevated positions are provided. Each information for an object $O \in O$ including a position and a type of the respective object O. In a second step 202, an actual aircraft position P(t) is measured. In a third step 203, waypoints $WP_i$ determining an aircraft intended flight track are being provided. In a fourth step 204, one object $O_i(WP_i)$ per waypoint $WP_i$ is selected depending on given selection criteria, with $O_i(WP_i) \in O$. In a fifth step 205 an information $I(O_i(WP_i))$ referring to the selected object $O_i(WP_i)$ is displayed, depending on the actual aircraft position $P(t)$.

The invention claimed is:

1. An aircraft navigation system comprising:
    a navigation-map data source, navigation-map data provided by the navigation-map data source including information about a multitude of objects O on earth surface which are of high potential visibility and high potential identifiability from positions elevated relative to the earth surface, each information for an object $O \epsilon O$ including a position and a type of the respective object O;
    a first system for measuring an actual aircraft position $P(t)$ at time t;
    a waypoint data source providing a plurality of waypoints $WP_i$ defining an aircraft intended flight track, wherein i is an integer and $WP_i$ represents one of the plurality of waypoints;
    a second system for selecting per waypoint $WP_i$ one object $O_i(WP_i)$ with $O_i(WP_i) \epsilon O$ depending on given selection criteria, wherein $O_i(WP_i)$ represents an object $O_i$ selected for the waypoint $WP_i$ and is one of the multitude of objects O; and
    a display for displaying an information $I(O_i(WP_i))$ referring the selected object $O_i(WP_i)$, wherein $I(O_i(WP_i))$ represents information I referring to the object $O_i$ selected for the waypoint $WP_i$,
    wherein a ranking index of each object $O \epsilon O$ concerning its potential visibility and potential identifiability is based on at least one of the following:
        a relative size of the object O compared to an environment $E(O)$ of the object O;
        a visible brightness contrast;
        a visible colour contrast between the object O and the environment $E(O)$ of the object O; or
        a geometric shape of the object O, and
    wherein the selection criteria consider
        a distance $d_{i,n}$ between a waypoint $WP_i$ and positions of neighbouring objects $O_n(WP_i)$ being positioned within a given maximum distance from the respective waypoint $WP_i$, with $O_n \epsilon O$, wherein n is an integer, $O_n(WP_i)$ is one of objects from the plurality of object O within the given maximum distance from the waypoint $WP_i$, $d_{i,n}$ is a distance a given object $O_n$ and the waypoint $WP_i$, and wherein $O_n$ is a sub-set of the set O, and/or
        the ranking index of the neighbouring objects $O_n(WP_i)$ concerning their potential visibility and potential identifiability.

2. The aircraft navigation system of claim 1,
    wherein display displays the information $I(O_i(WP_i))$ referring to the selected object $O_i(WP_i)$ depending on the actual aircraft position $P(t)$.

3. The aircraft navigation system of claim 1,
    wherein the types of the objects comprise lakes, shorelines, highways, streets, crossings, buildings, towers, bridges, churches.

4. The aircraft navigation system of claim 1,
    wherein the selection criteria consider a weighting of the ranking index of the neighbouring objects $O_n(WP_i)$ and the distance $d_{i,n}$.

5. The aircraft navigation system of claim 1,
    wherein the ranking index of each of the objects O is provided by the navigation-map data source.

6. The aircraft navigation system of claim 1,
    wherein the selection criteria consider at least one of the actual optical atmospheric conditions and the actual aircraft position $P(t)$, the actual optical atmospheric conditions is being provided by an actual-atmospheric-conditions data source.

7. The aircraft navigation system of claim 1,
    wherein the selection criteria consider at least one of a user-ranking-index concerning the potential visibility and a potential identifiability of the objects O, the user-ranking-index is being provided by a user-ranking-index data source, the user-ranking-index data can be changed by a user via a user input interface.

8. The aircraft navigation system of claim 1,
    wherein the display is a head-up-display.

9. The aircraft navigation system of claim 1,
    wherein the display is a display of smart glasses.

10. The aircraft navigation system of claim 1,
    wherein the display is a navigation display or a primary flight display of the aircraft.

11. The aircraft navigation of claim 1,
    wherein the information $I(O_i(WP_i))$ is at least one of
        a symbol representing the object $O_i(WP_i)$,
        a picture of the object $O_i(WP_i)$,
        an animation of the object $O_i(WP_i)$, and
        an alphanumeric information describing the object $O_i(WP_i)$.

12. An aircraft with an aircraft navigation system of claim 1.

13. A method for aircraft navigation, the method comprising:
    providing navigation-map data including information about a multitude of objects O on earth surface which are of high potential visibility and high potential identifiability from positions elevated relative to the earth surface, each information for an object $O \epsilon O$ including a position and a type of the respective object O;
    measuring an actual aircraft position $P(t)$ at time t;
    providing a plurality of waypoints $WP_i$ determining an aircraft intended flight track, wherein i is an integer and $WP_i$ represents one of the plurality of waypoints;
    selecting one object $O_i(WP_i)$ per waypoint $WP_i$, with $O_i(WP_i) \epsilon O$ depending on given selection criteria wherein $O_i(WP_i)$ represents an object $O_i$ selected for the waypoint $WP_i$ and is one of the multitude of objects O; and
    displaying an information $I(O_i(WP_i))$ referring the selected object $O_i(WP_i)$ wherein $I(O_i(WP_i))$ represents information I referring to the object $O_i$ selected for the waypoint $WP_i$,
    wherein a ranking index of each object $O \epsilon O$ concerning its potential visibility and potential identifiability is based on at least one of the following:
    a relative size of the object O compared to an environment $E(O)$ of the object O;
    a visible brightness contrast;
    a visible colour contrast between the object O and the environment $E(O)$ of the object O; or
    a geometric shape of the object O, and
    wherein the selection criteria consider
        a distance $d_{i,n}$ between a waypoint $WP_i$ and positions of neighbouring objects $O_n(WP_i)$ positions of neighbouring objects $O_n(WP_i)$ being positioned within a given maximum distance from the respective waypoint $WP_i$, with $O_n \epsilon O$, wherein n is an integer, $O_n(WP_i)$ is one of objects from the plurality of object O within the given maximum distance from the waypoint $WP_i$, $d_{i,n}$ is a distance a given object $O_n$ and the waypoint $WP_i$, and wherein $O_n$ is a sub-set of the set O, and/or the ranking index of the neighbouring objects $O_n(WP_i)$ concerning their potential visibility and potential identifiability.

14. The method for aircraft navigation of claim 13, wherein the information $I(O_t(WP_t))$ referring to the selected object $O_t(WP_t)$ is displayed depending on the actual aircraft position $P(t)$.

\* \* \* \* \*